(12) United States Patent
Dietl

(10) Patent No.: US 6,834,907 B2
(45) Date of Patent: Dec. 28, 2004

(54) INTERLOCKING DEVICE FOR THE FOLDING ROOF OF A MOTOR VEHICLE

(75) Inventor: Rudolf Dietl, Munich (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/358,147

(22) Filed: Feb. 5, 2003

(65) Prior Publication Data
US 2003/0146643 A1 Aug. 7, 2003

(30) Foreign Application Priority Data
Feb. 7, 2002 (DE) .......................... 102 05 144

(51) Int. Cl.[7] ................................................ B60J 7/185
(52) U.S. Cl. .............. 296/121; 296/107.01; 292/DIG. 5
(58) Field of Search ........................... 296/121, 107.01, 296/128, 132, 120.1; 292/DIG. 5

(56) References Cited

U.S. PATENT DOCUMENTS

| | | | | |
|---|---|---|---|---|
| 3,353,864 A | * | 11/1967 | Antaya et al. .............. | 296/121 |
| 4,664,436 A | | 5/1987 | Eyb | |
| 4,815,775 A | * | 3/1989 | Mertin et al. ............... | 292/201 |
| 5,058,939 A | * | 10/1991 | Miilu .......................... | 292/110 |
| 5,284,378 A | * | 2/1994 | Sautter, Jr. ................. | 296/224 |
| 5,413,390 A | * | 5/1995 | Filippi ......................... | 292/96 |
| 6,042,174 A | * | 3/2000 | Durrani ...................... | 296/121 |
| 6,213,534 B1 | * | 4/2001 | MacFarland ................ | 296/121 |
| 6,419,297 B2 | * | 7/2002 | Haberl et al. ............... | 296/121 |
| 6,520,560 B2 | * | 2/2003 | Schutt et al. ............... | 296/121 |
| 2002/0021021 A1 | | 2/2002 | Schutt et al. | |

FOREIGN PATENT DOCUMENTS

| | | |
|---|---|---|
| DE | 41 11 646 A1 | 10/1992 |
| DE | 195 39 085 A1 | 4/1997 |
| DE | 297 03 774 U1 | 11/1997 |
| DE | 198 01 852 A1 | 7/1999 |
| DE | 199 44 615 A1 | 4/2001 |
| DE | 199 64 066 A1 | 7/2001 |
| DE | 101 05 771 A1 | 9/2002 |
| EP | 0 592 109 A1 | 4/1994 |
| EP | 0 657 607 A1 | 6/1995 |
| EP | 1 060 926 A2 | 10/2000 |
| EP | 1 053 900 A2 | 11/2000 |
| EP | 1 072 456 A2 | 1/2001 |

* cited by examiner

Primary Examiner—D. Glenn Dayoan
Assistant Examiner—Greg Blankenship
(74) Attorney, Agent, or Firm—Nixon Peabody LLP; David S. Safran

(57) ABSTRACT

An interlocking device for the folding roof of a motor vehicle with a locking hook (4) which is pivotally mounted on the front frame part (1) of the folding roof and which can be moved by means of a multiple connecting rod mechanism and can be interlocked in latching engagement on a vehicle-mounted abutment, the multiple connecting rod mechanism, especially a four-bar mechanism (6, 12, 14, 15), containing the locking hook (4) and being located self-locking in the closed position.

20 Claims, 4 Drawing Sheets

INTERLOCKING DEVICE FOR THE FOLDING ROOF OF A MOTOR VEHICLE

BACKGROUND OF THE INVENTION

1. Field of the Invention

The invention relates to an interlocking device for the folding roof of a motor vehicle with a locking hook which is pivotally mounted on the front frame part of the folding roof and which can be moved by means of a multiple connecting rod means and can be interlocked in latched engagement on a vehicle-mounted abutment.

2. Description of Related Art

German Utility Model DE 297 03 774 U1 discloses a lock for a cabriolet convertible top which has a latch hook which is mounted on the front end of the roof of the cabriolet so as to be able to pivot around a transverse axis of the motor vehicle and which can be pivoted by means of a four-bar mechanism which is activated by a handle into its locking position in which it keeps the roof of the cabriolet convertible top closed and locked on the apron.

SUMMARY OF THE INVENTION

The primary object of the present invention is to provide an interlocking device of the initially mentioned type which has a reliable movement mechanism and a simple structure.

This object is achieved in accordance with the invention in the aforementioned interlocking device by a multiple connecting rod means, especially a four-bar mechanism arrangement, being coupled to a linear drive mechanism which is movably supported on the front frame part. The linear drive mechanism offers the advantage of simple support on the frame part and reliable actuation by its own drive or by branching from a convertible top drive. A linear drive mechanism is defined as any drive mechanism which is moved lengthwise on the frame part, such as, for example, a drive rod or even a compressively stiff drive cable.

This object is achieved in accordance with the invention in the aforementioned interlocking device in that the multiple connecting rod means, especially the four-bar mechanism arrangement, contains the locking hook and is self-locking in the closed position. This configuration makes it possible to prevent the forces acting on the locking hook, and which are designed to move it in the opening direction, from causing opening.

The indicated interlocking device is suitable for any type of lowerable motor vehicle roof, especially of cabriolets, such as folding roofs or collapsible convertible tops, and especially for those convertible tops which, on the side members, have guide rails for a front roof bow which can be pushed into the partially open position, while the side members are still coupled to the vehicle-mounted abutment. The vehicle-mounted abutment is, for example, a pin which is attached to the cross member above the windshield, e.g., the windshield header, to the apron or the A column. There can be one or more interlocking means in accordance with invention on the frame, especially on the right and left roof side and on the respective side member.

Preferably, the linear drive mechanism is coupled to the convertible top drive so that the opening and closing motion of the convertible top or of a bow of the convertible top is used for opening and closing the locking hook.

In one simple configuration, the linear drive mechanism can be hinged via an intermediate lever to the pivot lever of the four-bar mechanism arrangement. Depending on the arrangement of the intermediate lever, dynamic behavior which is dependent on the path of motion can be set.

If, according to one embodiment, the pivot lever of the multiple-bar or four-bar mechanism arrangement has an arc-shaped drive segment and a pinion which is drive-engaged to the drive segment and also to the linear drive mechanism, a constant drive moment can be transmitted to the four-bar mechanism arrangement.

Self-locking of the movement mechanism or the multiple-bar or four-bar mechanism arrangement can be achieved by the four-bar mechanism arrangement assuming the dead center or top dead center position in the closed position.

If the locking hook has an eccentric path of contact for locking on the vehicle-mounted abutment, the pivotable locking hook can pull the frame part during the closing process against the abutment, for example, against the seal on the apron.

Feasibly, the front frame part is a roof tip, a transverse frame part or a side member of the convertible top frame.

Embodiments of the interlocking device are explained in detail below with reference to the drawings.

DETAILED DESCRIPTION OF THE INVENTION

Figure 1:
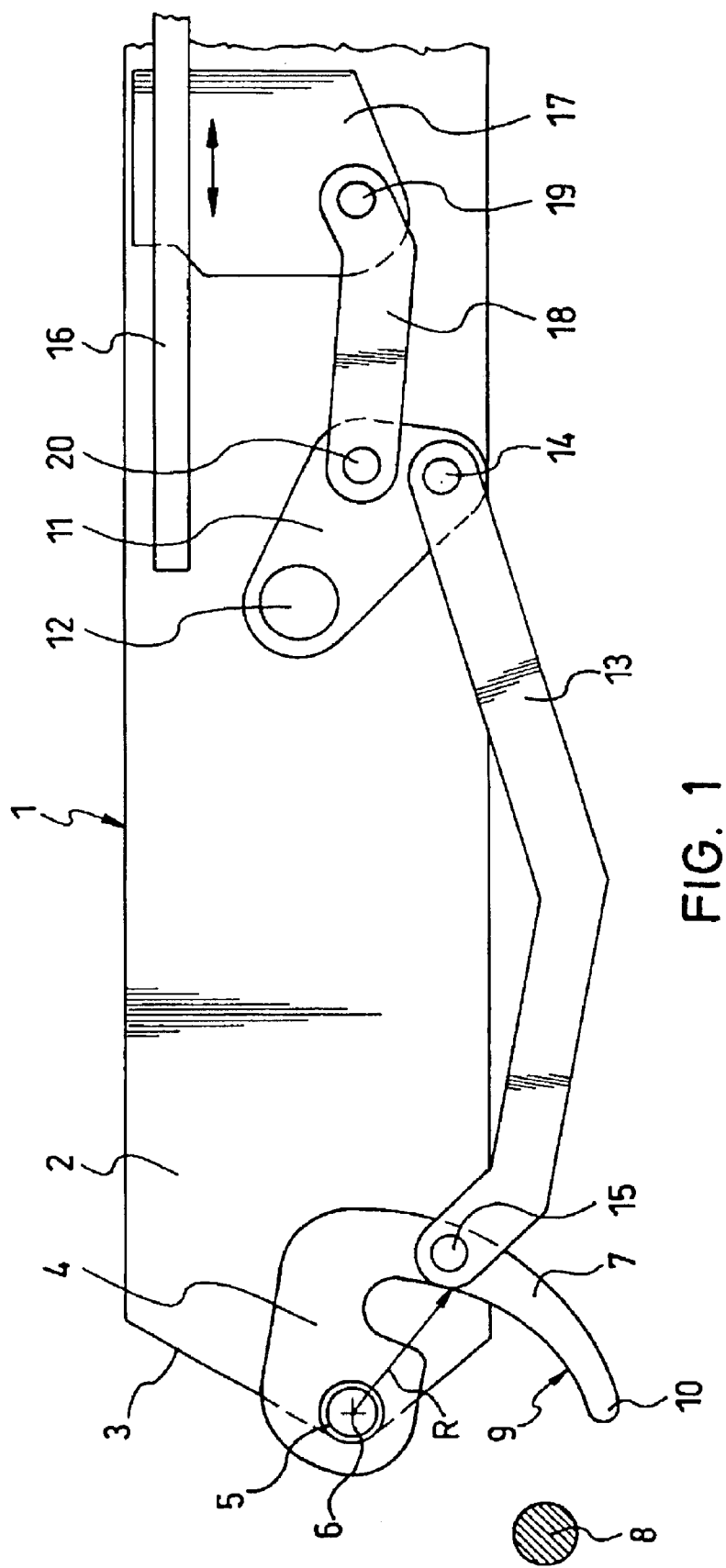
FIG. 1 is a schematic side view of a first embodiment of an interlocking device with a locking hook in the open position.

The convertible top of a cabriolet, such as a folding or collapsible convertible top, contains a convertible top frame with two opposing identical frame parts or side members, of which the left side member 1 is shown in FIG. 1 with its front section 2. The locking hook 4 of the interlocking device is pivotally supported by means of a pivot bearing 5 to be able to pivot around a transverse axis 6 on the front end 3 of each side member 1. The locking hook 4 has a hook-shaped front end 7 for reaching around a pin 8 which is attached to a vehicle-mounted part, such as, for example, a cross member above the windshield, windshield header, the apron or the A column of the vehicle, and forms a latch abutment on which the side member 1 is held locked in the closed position of the convertible top. The hook-shaped front end 7 of the locking hook 4 forms an engagement surface 9 which is faces toward the transverse axis 6 and which is at a distance (represented by arrow R) from the transverse axis 6 which decreases from the tip 10 of the hook-shaped front end 7 along the engagement surface 9 in the manner of eccentric curve so that, when the locking hook 4 is closed (pivoting motion from FIG. 1 to FIG. 2), the side member 1 or the transverse axis 6 is pulled toward the pin 8, while the pin 8 slides on the engagement surface 9.

The actuating means of the interlocking device for pivoting the locking hook 4 has a pivot lever 11 which is pivotally supported for rotation around a pivot axis 12 on the side member 1. A connecting lever 13 is supported on the pivot lever 11 so as to be able to pivot on the pivot lever 11 around a pivot axis 14 and on the locking hook 4 around a pivot axis 15, and thus, is part of a four-bar mechanism which includes the pivot axes 6, 12 on the side member 1. The connecting lever 13 can thus transmit an actuating force from the pivot lever 11 to the locking hook 4.

A push-rod 16 is movably supported on the side member 1 and is securely connected to a bearing arm 17 which protrudes downward and to which a second connecting lever 18 is coupled for movement around a pivot axis 19 which, on the other hand, is coupled to the pivot lever 11 at a pivot axis 20 which is adjacent to the pivot axis 14. The push-rod 16 is coupled, either via a latch mechanism to the convertible top mechanism, such that a portion of the path of motion of the convertible top drive is transmitted to the push-rod 16, or it has its own controlled electrical or hydraulic drive. The push-rod 16 is pushed forward along the side member 1 from the position as shown in FIG. 1, in which the side member 1 has approached the pin 8 but the locking hook 4 is still open. In doing so, it actuates, via the bearing arm 17, the second connecting lever 18, the pivoting swivel lever 11 and the first connecting lever 13, and the locking hook 4 to bring the hook 4 into pivoted position which is shown in FIG. 2 and in which the licking hook 4 has pulled the pin 8 along the engagement surface 9 into the end position which is adjacent to the transverse axis 6 of the pivot bearing 5 and has pulled the side member 1 forward toward the pin 8.

In this end position or closed position, the pivot lever 11 is pivoted into the front position such that the pivot axis 14 of the connecting lever 13 on the pivot lever 11 lies on or preferably above a straight line (represented by a dot-dash line in FIG. 2) between the pivot axis 12 of the pivot lever 11 and the pivot axis 15 on the locking hook 4. The force which engages the locking hook 4 in the opening direction would thus either not swing the pivot lever 11 or press it in the closing direction (clockwise in FIG. 2) so that the closed position represents a dead center or top dead center position in which the mechanism is self-locking.

Figure 2:
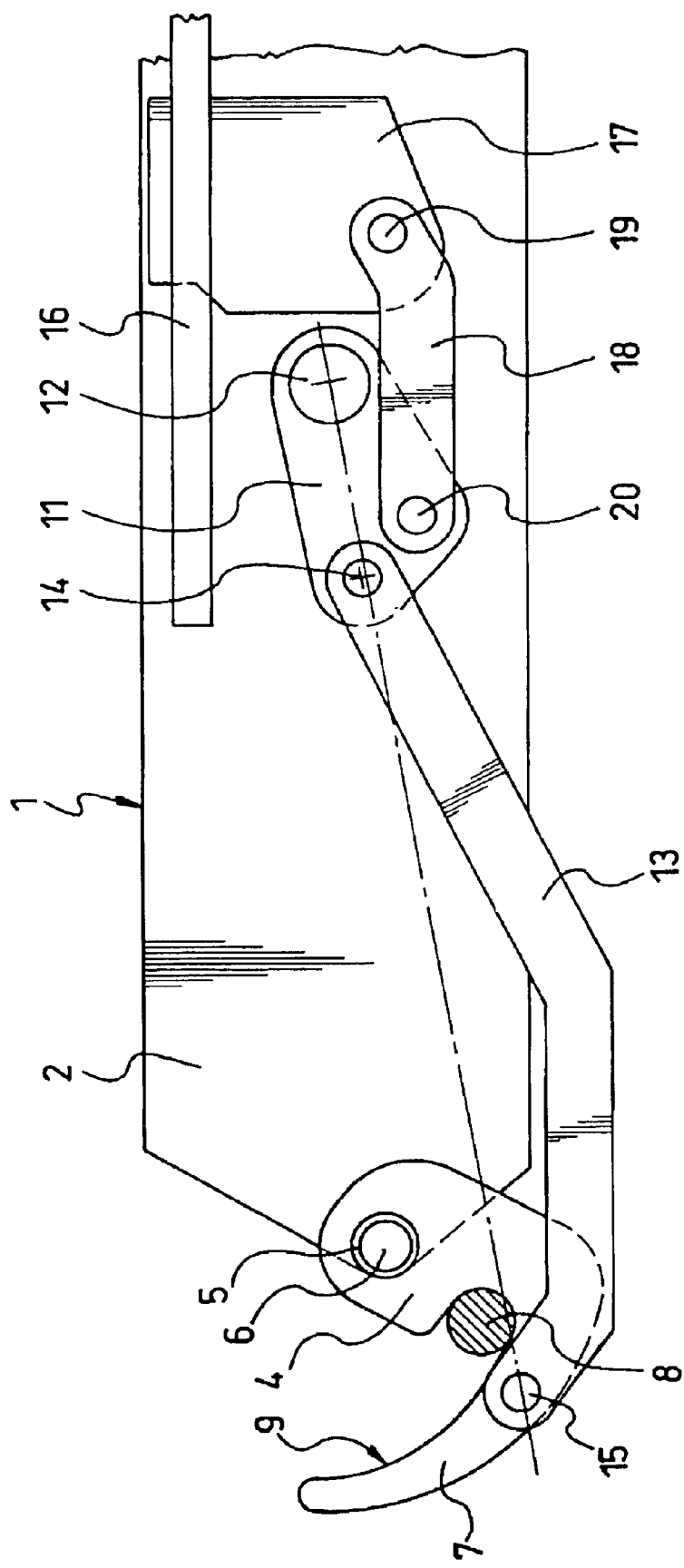
FIG. 2 is a schematic side view of the first embodiment with the locking hook closed.

The interlock is opened in the opposite sequence of motions (from FIG. 2 to FIG. 1).

Figure 3:
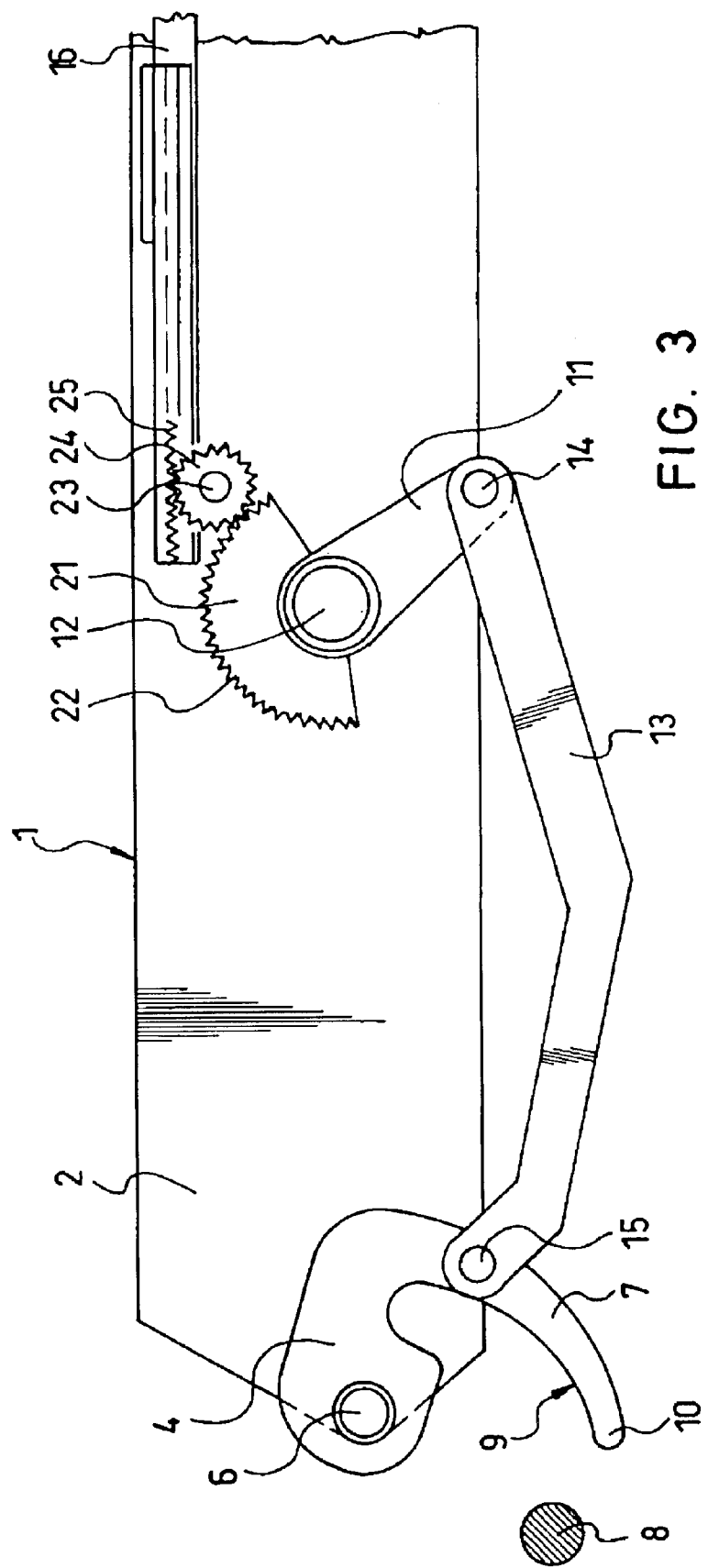
FIG. 3 is a schematic side view of a second embodiment of the interlocking device with a modified drive means in the open position.
Figure 4:
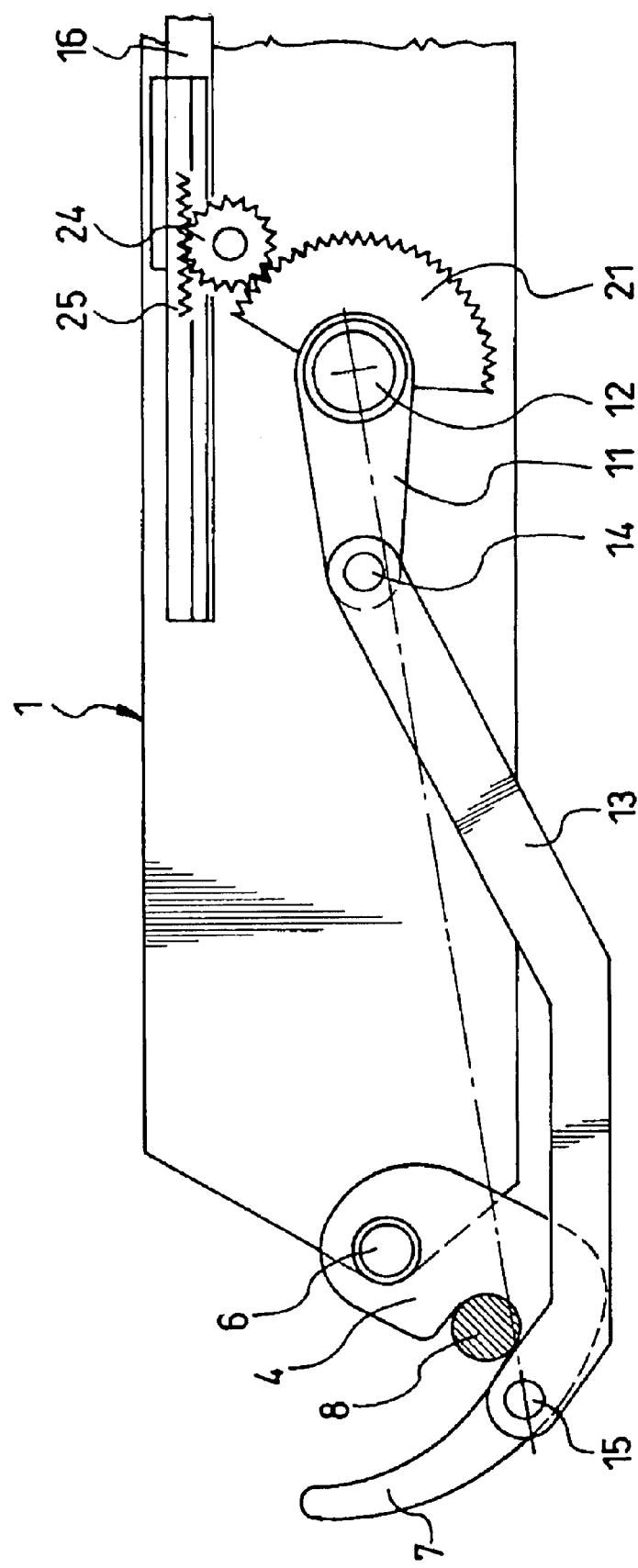
FIG. 4 is a schematic side view of the second embodiment of the interlocking device in the closed position.

In one modified embodiment of the locking device (see FIGS. 3 & 4), the pivot lever 11 contains an arc-shaped drive segment 21 with teeth 22 into which a pinion 24, which is supported by means of the axis 23 of rotation on the side member 1, fits. The pinion 24 engages a rack 25 which is attached to the push-rod 16 and is driven by it when the push-rod 16 is pushed in the above described manner relative to the side member 2.

The closed position (FIG. 4) in turn forms the top dead center position with self-locking, in which the coupling of the connecting lever 13 (pivot axis 14) to the pivot lever 11 is above the straight line between the pivot axis 12 of the pivot lever 11 and the pivot axis 15 on the locking hook 4.

The transmission of force from the rack 25 to the pivot lever 11 takes place, in this embodiment, with a constant torque as a result of the engagement of the pinion 24 on the arc-shaped drive segment 21.

Instead of force transmission by means of teeth, a toothed belt or a chain between the pinion 24 or a wheel and the corresponding drive part on the pivot lever 11 can be used.

What is claimed is:

1. Interlocking device for a folding roof of a motor vehicle, comprising:
    a locking hook which is adapted to be pivotally mounted on a front frame part of a folding roof and which adapted to interlock in latching engagement with a vehicle-mounted abutment;
    a multiple connecting rod means for moving the locking hook;
    wherein the multiple connecting rod means is coupled to a linear drive mechanism which is adapted to be movably supported on said front frame part, wherein said multiple connecting rod means comprises a four-bar mechanism, wherein the locking hook forms a part of the four-bar mechanism, and wherein the four-bar mechanism is arranged to be self-locking in the closed position.

2. Interlocking device as claimed in claim 1, wherein the linear drive mechanism is hinged via an intermediate lever to a pivot lever of the four-bar mechanism.

3. Interlocking device as claimed in claim 1, wherein a pivot lever of the four-bar mechanism has an arc-shaped drive segment and a pinion which is drive-engaged both to the drive segment and also to the linear drive mechanism.

4. Interlocking device as claimed in claim 1, wherein the four-bar mechanism, in a closed position thereof, assumes a top dead center or overtop dead center position for producing said self-locking.

5. Interlocking device as claimed in claim 1, wherein the locking hook has an eccentric surface of contact for locking on the vehicle-mounted abutment.

6. Interlocking device for a folding roof of a motor vehicle, comprising:
    a locking hook which is adapted to be pivotally mounted on a front frame part of a folding roof and which adapted to interlock in latching engagement with a vehicle-mounted abutment;
    a multiple connecting rod means for moving the locking hook;
    wherein said multiple connecting rod means comprises a four-bar mechanism, wherein the locking hook forms a part of the four-bar mechanism, and wherein the four-bar mechanism is arranged to be self-locking in the closed position.

7. Interlocking device as claimed in claim 6, wherein the multiple connecting rod means is adapted for coupling to a linear drive mechanism which is movably supported on the front frame part.

8. Interlocking device as claimed in claim 6, wherein the locking hook has an eccentric surface of contact for locking on the vehicle-mounted abutment.

9. Interlocking device as claimed in claim 6, wherein the four-bar mechanism, in a closed position thereof, assumes a top dead center or overtop dead center position for producing said self-locking.

10. A motor vehicle, comprising:
    an abutment mounted of a vehicle body part;
    a folding roof having a front frame part;
    a locking hook which is pivotally mounted on the front frame part of the folding roof and which is arranged for latching engagement with said vehicle-mounted abutment; and
    a multiple connecting rod means for moving the locking hook;
    wherein the multiple connecting rod means is coupled to a linear drive mechanism which is movably supported on said front frame part, wherein said multiple connecting rod means comprises a four-bar mechanism, wherein the locking hook forms a part of the four-bar mechanism, and wherein the four-bar mechanism is arranged to be self-locking in the closed position.

11. Motor vehicle as claimed in claim 10, wherein the linear drive mechanism is coupled to a drive for folding of the folding roof.

12. Motor vehicle as claimed in claim 10, wherein the front frame part is one of a roof tip, a transverse frame part and a side member of a convertible top frame.

13. Motor vehicle as claimed in claim 10, wherein the linear drive mechanism is hinged via an intermediate lever to a pivot lever of the four-bar mechanism.

14. Motor vehicle as claimed in claim 10, wherein a pivot lever of the four-bar mechanism has an arc-shaped drive segment and a pinion which is drive-engaged both to the drive segment and also to the linear drive mechanism.

15. Motor vehicle as claimed in claim 10, wherein the four-bar mechanism, in a closed position thereof, assumes a top dead center or overtop dead center position for producing said self-locking.

16. Motor vehicle as claimed in claim 10, wherein the locking hook has an eccentric surface of contact for locking on the vehicle-mounted abutment.

17. Interlocking device for a folding roof of a motor vehicle, comprising:
- a locking hook adapted to be pivotally mounted on a front frame part of a folding roof to pivot around a locking hook axis between an open position and a closed position, said locking hook adapted to interlock in latching engagement with a vehicle-mounted abutment when in said closed position, said locking hook axis being pulled toward said abutment when said locking hook pivots from said open position toward said closed position, said locking hook having an eccentric surface of contact for locking on the vehicle-mounted abutment;
- a multiple connecting rod means for moving the locking hook;
- wherein the multiple connecting rod means is coupled to a linear drive mechanism which is adapted to be movably supported on said front frame part.

18. A motor vehicle, comprising:
- an abutment mounted of a vehicle body part;
- a folding roof having a front frame part;
- a locking hook which is pivotally mounted on the front frame part of the folding roof to pivot around a locking hook axis between an open position and a closed position, said locking hook being arranged for latching engagement with said vehicle-mounted abutment when in said closed position, said locking hook axis being pulled toward said abutment when said locking hook pivots from said open position toward said closed position; and
- a multiple connecting rod means for moving the locking hook;
- wherein the multiple connecting rod means is coupled to a linear drive mechanism which is movably supported on said front frame part;
- wherein the locking hook has an eccentric surface of contact for locking on the vehicle-mounted abutment.

19. Interlocking device for a folding roof of a motor vehicle, comprising:
- a locking hook which is adapted to be pivotally mounted on a front frame part of a folding roof and which adapted to interlock in latching engagement with a vehicle-mounted abutment;
- a multiple connecting rod means for moving the locking hook;
- wherein the multiple connecting rod means is coupled to a linear drive mechanism which is adapted to be movably supported on said front frame part;
- wherein the multiple connecting rod means includes a four-bar mechanism which, in a closed position thereof, assumes a top dead center or overtop dead center position for producing self-locking.

20. A motor vehicle, comprising:
- an abutment mounted of a vehicle body part;
- a folding roof having a front frame part;
- a locking hook which is pivotally mounted on the front frame part of the folding roof and which is arranged for latching engagement with said vehicle-mounted abutment; and
- a multiple connecting rod means for moving the locking hook;
- wherein the multiple connecting rod means is coupled to a linear drive mechanism which is movably supported on said front frame part;
- wherein the linear drive mechanism is coupled to a drive for folding of the folding roof.

* * * * *